US009008492B2

(12) United States Patent
Sugiuchi

(10) Patent No.: US 9,008,492 B2
(45) Date of Patent: Apr. 14, 2015

(54) IMAGE PROCESSING APPARATUS METHOD AND COMPUTER PROGRAM PRODUCT

(75) Inventor: Rui Sugiuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/468,060

(22) Filed: May 10, 2012

(65) Prior Publication Data

US 2012/0301110 A1 Nov. 29, 2012

(30) Foreign Application Priority Data

May 27, 2011 (JP) ................. 2011-118903

(51) Int. Cl.
*H04N 5/92* (2006.01)
*H04N 21/431* (2011.01)
*H04N 21/435* (2011.01)
*H04N 21/4788* (2011.01)

(52) U.S. Cl.
CPC ......... *H04N 21/431* (2013.01); *H04N 21/4351* (2013.01); *H04N 21/4788* (2013.01)

(58) Field of Classification Search
CPC ............ H04N 21/4884; H04N 13/007; H04N 19/00769; H04N 21/2362; H04N 21/4345; H04N 21/435; H04N 21/478; H04N 7/10; H04N 13/0048; H04N 13/0066; H04N 1/0044; H04N 21/23614; H04N 21/4348; H04N 21/44; H04N 2101/00; H04N 21/2181; H04N 21/23418; H04N 21/23424; H04N 21/2368; H04N 21/2407; H04N 21/4147; H04N 21/4307; H04N 21/4331; H04N 21/4341; H04N 21/44204; H04N 21/4622; H04N 21/4722
USPC .......................... 386/231, 234, 239, 244, 245
See application file for complete search history.

(56) References Cited

U.S. PATENT DOCUMENTS

| | | | |
|---|---|---|---|
| 6,594,825 B1 * | 7/2003 | Goldschmidt Iki et al. ..... | 725/53 |
| 7,757,254 B2 * | 7/2010 | Shoff et al. ..................... | 725/44 |
| 2001/0012444 A1 * | 8/2001 | Ito et al. ......................... | 386/111 |
| 2004/0008277 A1 * | 1/2004 | Nagaishi et al. ............... | 348/468 |
| 2008/0031597 A1 * | 2/2008 | Nakatsu ......................... | 386/124 |
| 2008/0152308 A1 * | 6/2008 | Kang et al. ..................... | 386/95 |
| 2008/0255944 A1 * | 10/2008 | Shah et al. ..................... | 705/14 |
| 2010/0157025 A1 * | 6/2010 | Suh et al. ........................ | 348/51 |
| 2011/0173238 A1 * | 7/2011 | Griggs .......................... | 707/805 |

* cited by examiner

*Primary Examiner* — Tat Chio
(74) *Attorney, Agent, or Firm* — Oblon, McClelland, Maier & Neustadt, L.L.P.

(57) ABSTRACT

An image processing apparatus, method and computer program storage device cooperate to receive character information and broadcast program information, and then insert the character information in a capture portion of the program information. The program information includes audio-visual data to be displayed, as well as caption attribute information.

19 Claims, 15 Drawing Sheets

IMAGE PROCESSING APPARATUS METHOD AND COMPUTER PROGRAM PRODUCT

BACKGROUND

The present disclosure relates to an image processing apparatus, method and computer program product for displaying character information such as a tweet regarding a broadcast program on a screen along with the broadcast program, and relates to a video-picture recording apparatus for recording the character information and the broadcast program.

At the present day, there has been provided a TWITTER (a registered trademark) which renders short-sentence services serving as a function between chatting, and a blog and an SNS (Social Network Service) through a network such as the Internet. These services allow short-sentence tweets following a specific short-sentence tweet registered by a certain user in a TWITTER server to be registered by an unspecified user other than the certain user. In this way, a user is capable of disclosing a tweet of its own with a light heart whereas other users are capable of, among others, responding to the tweet. The number of characters included in a tweet that can be registered is 140 or an integer smaller than 140. Posted tweets are displayed along the time axis by adoption of a display method referred to as a time line. That is, a tweet posted most recently is displayed on the top to be followed sequentially in the downward direction by tweets posted less recently to form a flow of tweets. Each individual link information for a still picture, a moving picture or a piece of music can be added to a tweet after the still picture, the moving picture or the piece of music has been uploaded at another site to result in the link information.

By looking at a hash-tag in a posted tweet, it is possible to identify what the tweet has been posted for. There are a number of users each posting a tweet for a broadcast TV program. In this case, if the broadcasting station is the NHK (Nihon Housou Kyoukai) for example, a "#nhk" hash-tag seen by a user as a hash-tag included in a tweet makes the user capable of determining that the tweet has been posted as a tweet for the NHK.

In recent years, there has been provided a function for displaying information on tweets regarding such a broadcast program on a screen of a TV receiver or the like along with the broadcast program. For details of the function, the reader is advised to refer to Non-Patent Document 1, "Linked Network Torne Update Ver. 2.10 Library," Sony Computer Entertainment Corporation [online], searched on Mar. 18, 2011, Internet <URL: http://www.jp.playstation.com/ps3/torne/update/index.html>.

SUMMARY

In order to display a tweet along with a broadcast program on a screen, however, the display area of the broadcast program is contracted to secure another window to serve as a frame for displaying the tweet. In addition, if the tweet is simply displayed on the screen, it is quite within the bounds of possibility that important portions of an image of the program are inadvertently concealed behind the tweet.

It is thus an aim of the present disclosure addressing the problem described above to display character information such as a tweet regarding a broadcast program at a proper position on a screen along with the broadcast program.

Since caption information of a broadcast program is provided by the broadcasting station, in many cases, the caption information is displayed at a position raising no problem even if the caption information is superposed on the image of the program. Thus, if character information such as a tweet regarding a broadcast program is displayed by making use of display position information included in the caption information of the broadcast program, the character information can be displayed at a proper position indicated by the display position information.

According to one embodiment, an image processing apparatus includes a network communication section that receives character information from a remote device;

a program receiving section that receives broadcast program information, the program information including audio-visual data to be displayed and caption attribute information; and an image generation section that inserts the character information in a caption portion of the program information.

According to one aspect of this embodiment, the image generation section inserts the character information for display on a display device based on position information of the caption character information, the position information being included in the attribute information.

According to another aspect, the character information is program-related character information, and the image generation section inserts the program-related character information for display on a display device.

According to another aspect, the image generation section inserts the character information for display on a display apparatus at a fixed location on the image when the caption character information is not included in the broadcast program information.

According to another aspect, the apparatus further includes a specification information generation section that searches a storage device for specification information associated based on an identified broadcast station from a program array information analysis section and sends an address to the remote device for identification of the character information that corresponds with the program information.

According to another aspect, the apparatus further includes a specification information generation section that searches a storage device for specification information associated based on user setting information and sends an address to the remote device for identification of the character information that corresponds with the user setting information.

According to another aspect, the apparatus further includes a specification information generation section that generates specification information based on characters included in electronic program guide information and acquires the character information about a program that is not directly broadcast to the apparatus from a broadcast station.

According to another aspect, the image generation section selects the character information as caption information when obtained from a caption processing section and selects the character information as a tweet when received from a tweet processing section.

According to another aspect, the information generation section inserts the character information in the caption portion of the program information in order of character-information acquisition time for fixed time intervals.

According to another aspect, a number of characters in the character information is limited to a predetermined number.

According to another aspect, the apparatus further includes a video-picture recording processing section that prepares and stores a video image that has the character information inserted in the caption portion of the program information.

According to an image processing method embodiment, the method includes receiving at a network communication section character information from a remote device;

receiving broadcast program information at a program receiving section, the program information including audio-visual data to be displayed and caption attribute information; and inserting the character information in a caption portion of the program information.

According to one aspect of this embodiment the inserting includes inserting the character information for display on a display device based on position information of the caption character information, the position information being included in the attribute information.

According to another aspect, the character information is program-related character information, and the inserting includes inserting the program-related character information for display on a display device.

According to another aspect, the inserting inserts the character information for display on a display apparatus at a fixed location on the image when the caption character information is not included in the broadcast program information.

According to another aspect, the method further includes searching a storage device for specification information associated based on an identified broadcast station from a program array information analysis section and sending an address to the remote device for identification of the character information that corresponds with the program information.

According to another aspect, the method further includes searching a storage device for specification information associated based on user setting information and sending an address to the remote device for identification of the character information that corresponds with the user setting information.

According to another aspect, the method further includes generating specification information based on characters included in electronic program guide information and acquiring the character information about a program that is not directly broadcast to the apparatus from a broadcast station.

According to another aspect, the selecting includes selecting the character information as caption information when obtained from a caption processing section and selecting the character information as a tweet when received from a tweet processing section.

According to a non-transitory computer readable storage device embodiment, the device includes instructions stored therein that when executed by a processing circuit perform a method that includes receiving at a network communication section character information from a remote device;

receiving broadcast program information at a program receiving section, the program information including audio-visual data to be displayed and caption attribute information; and inserting with the processing circuit the character information in a caption portion of the program information.

As described above, in accordance with the embodiment of the present disclosure, it is possible to insert program-related character information such as a tweet regarding a broadcast program into a proper position in an image of the broadcast program and possible to display and record the character information in a display apparatus and an image recording apparatus respectively along with the broadcast program.

BRIEF DESCRIPTION OF THE DRAWINGS

FIG. 2A is an explanatory diagram showing a typical screen exhibiting a typical display of a caption;

FIG. 2B is an explanatory diagram showing a typical screen exhibiting a typical display of a tweet;

DETAILED DESCRIPTION OF THE PREFERRED EMBODIMENTS

Embodiments of the disclosure are explained by referring to accompanying diagrams as follows. In the diagrams, every configuration element common to the embodiments is denoted by the same reference symbol and the common configuration element is explained only once in order to avoid duplications of descriptions. The embodiments are explained in chapters arranged in the following order:

1: First Embodiment

This chapter explains an image processing apparatus which is a typical apparatus for acquiring a tweet attached by a broadcasting station.

1-1: Modified Version

This sub-chapter explains an image processing apparatus which is a typical apparatus for extracting characters from information on a broadcast program, generating specification information and acquiring a tweet.

2: Second Embodiment

This chapter explains a typical video-picture recording apparatus.

3: Third Embodiment

This chapter explains a typical reproduction apparatus.

1: First Embodiment

A first embodiment to be explained below displays a received broadcast program and short-sentence character information such as a tweet represented by a TWITTER regarding the broadcast program together on the screen of a display apparatus. In this embodiment, the character information is a string of characters including at least kanji characters, kana characters, alphanumeric characters and symbols. It is assumed that the number of characters composing the character information is limited. For example, the number of characters is 140 or an integer smaller than 140.

Overview of the Character-Information Display System

Figure 1:
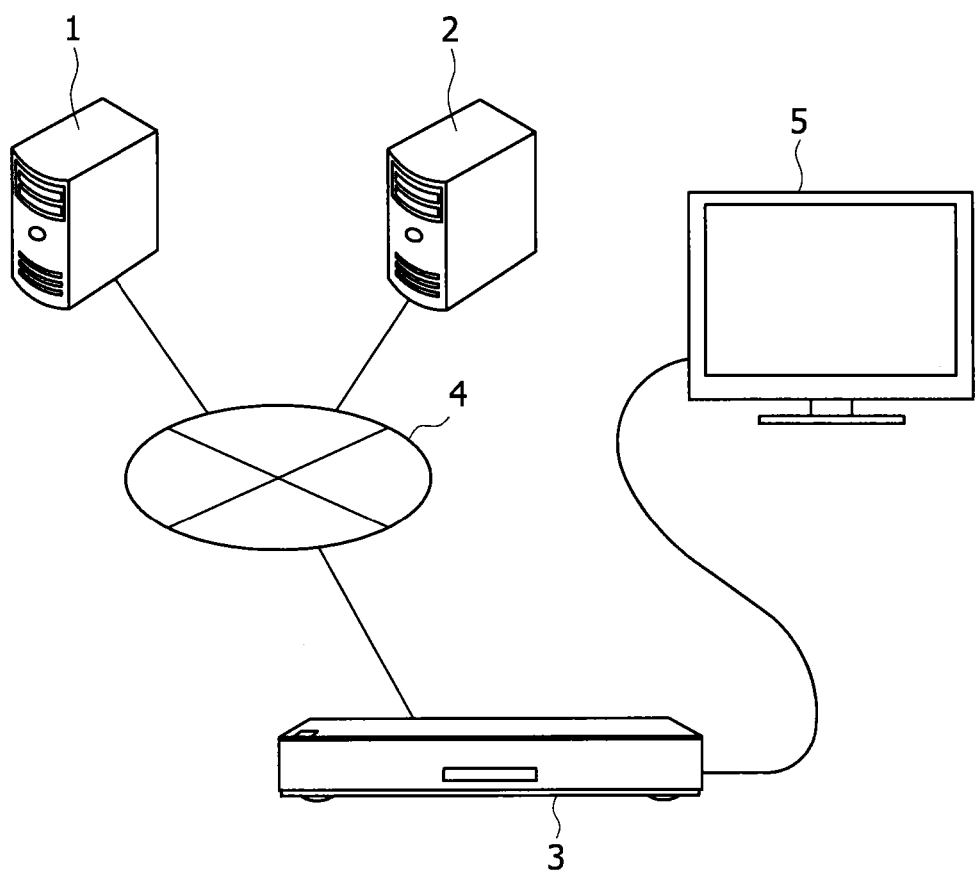
FIG. 1 is an explanatory diagram showing a model of a typical configuration of a character-information display system according to a first embodiment.

FIG. 1 is an explanatory diagram showing a model of a typical configuration of a character-information display system according to the first embodiment.

The character-information display system according to the first embodiment employs tweet-information server 1, a specification-information server 2 and an image processing apparatus 3. The tweet-information server 1 is a server in which a plurality of pieces of character information serving as a tweet have been stored. The image processing apparatus 3 receives TV broadcast waves conveying broadcast programs. The tweet-information server 1, the specification-information server 2 and the image processing apparatus 3 are connected to each other through a network 4 such as the Internet so that the tweet-information server 1, the specification-information server 2 and the image processing apparatus 3 are capable of communicating with each other. The image processing apparatus 3 is connected to a display apparatus 5. A typical general example of the image processing apparatus 3 is a video-picture recorder. The image processing apparatus 3 may receive a broadcast program by making use of a radio or wire facility.

The specification-information server 2 includes a saved specification-information table like typically Table 1 to be given below. It is to be noted that a service ID is information automatically assigned by a broadcasting station but the same broadcasting station may assign a service ID which may vary in accordance with the area.

TABLE 1

| Service ID | Broadcasting-station name | Specification information (hash-tag) |
| --- | --- | --- |
| 1024 | A Television | #AAA |
| 1040 | B Television | #BBB |
| 1048 | C Television | #CCC |
| 1056 | D Television | #DDD |
| 1072 | E Television | #EEE |

A piece of specification information on an entry of Table 1 serving as a specification-information table is information corresponding to a hash-tag of a TWITTER. The specification-information server 2 has a data table stored therein in advance as a table used for indicating association of each broadcasting station with a hash-tag used by the broadcasting station. A URL (Uniform Resource Locator) is created on the basis of this specification information. The URL is used for acquiring a tweet attached to broadcasting-station information included in information on a broadcast program. A typical example of the information on a broadcast program is SI (Service Information). The URL is the address of an information resource existing in the Internet. A typical example of the information resource is a resource of texts, images and the like.

A specification-information table can be acquired as follows. First of all, when the image processing apparatus 3 is activated or when an operation determined in advance is carried out, the specification-information table showing data of specification information is downloaded from the specification-information server 2 and the data is stored in storage section of the image processing apparatus 3. It is desirable to manage the data so as to always be the most recent data stored in the storage section of the image processing apparatus 3. Thereby, it is possible to keep up with increases/decreases of the broadcasting-station count and to keep up with addition of a new broadcasting station to the specification-information table or elimination of an existing broadcasting station from the specification-information table. For example, it is possible to provide a configuration in which, when the user carries out an operation on the image processing apparatus 3 to preset the frequency of a signal receivable from the image processing apparatus 3, the image processing apparatus 3 transmits information on a broadcasting station for the frequency preset in the image processing apparatus 3 to the specification-information server 2 whereas, in return, the specification-information server 2 transmits specification information attached to the received information on the broadcasting station to the image processing apparatus 3. A typical example of the specification information is a hash-tag.

It is to be noted that, in a configuration wherein the specification-information table is not downloaded from the specification-information server 2, the image processing apparatus 3 may directly create the specification-information table and store the specification-information table in the storage section thereof. In this case, the image processing apparatus 3 may create the specification-information table automatically or in accordance with a manual operation carried out by the user.

Next, an outline of operations carried out by the character-information display system is explained as follows.

First of all, the image processing apparatus 3 determines whether or not a new tweet exists in the tweet-information server 1. That is, by making use of certain specification information as a search key, the image processing apparatus 3 searches tweets registered in the tweet-information server 1 for a tweet associated with the specification information.

In the tweet-information server 1, an open API (Application Programming Interface) has been prepared so that, by merely carrying out a network communication (according to an HTTP/GET method), tweet information at an address specified by a URL can be obtained. If it is desired to acquire tweet information of an A television broadcasting station shown in Table 1 for example, typically, the image processing apparatus 3 specifies http://search.TWITTER.com/search.atom?q=%23AAA as the URL of the A television broadcasting station and transmits the URL to the tweet-information server 1. Then, the image processing apparatus 3 receives tweet information associated with #AAA representing the A television broadcasting station from the tweet-information server 1. The information received from the tweet-information server 1 is saved in the image processing apparatus 3 and displayed on the screen of the display apparatus 5.

Next, the following description explains a caption display and a tweet display which are generated in the character-information display system according to the present embodiment of the present disclosure.

Figure 2A:
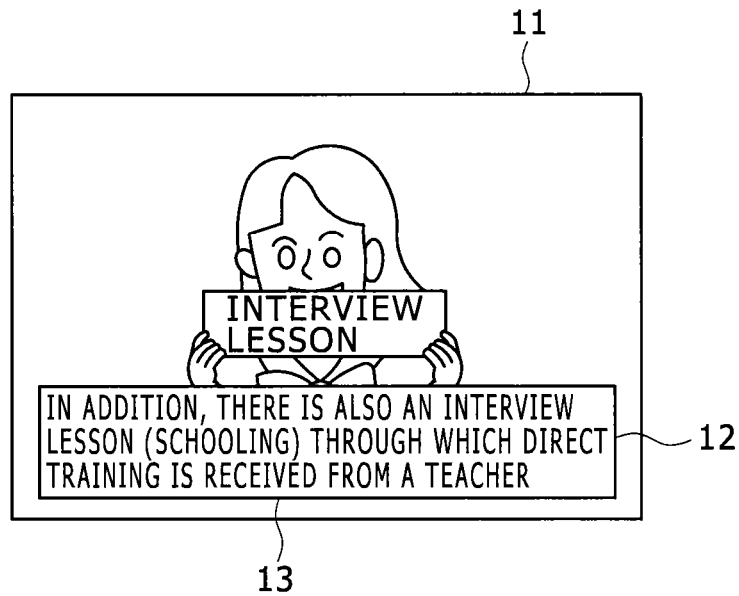
FIGS. 2A and 2B are a plurality of explanatory diagrams each showing a typical screen of a display apparatus employed in the character-information display system according to the first embodiment.
Figure 2B:
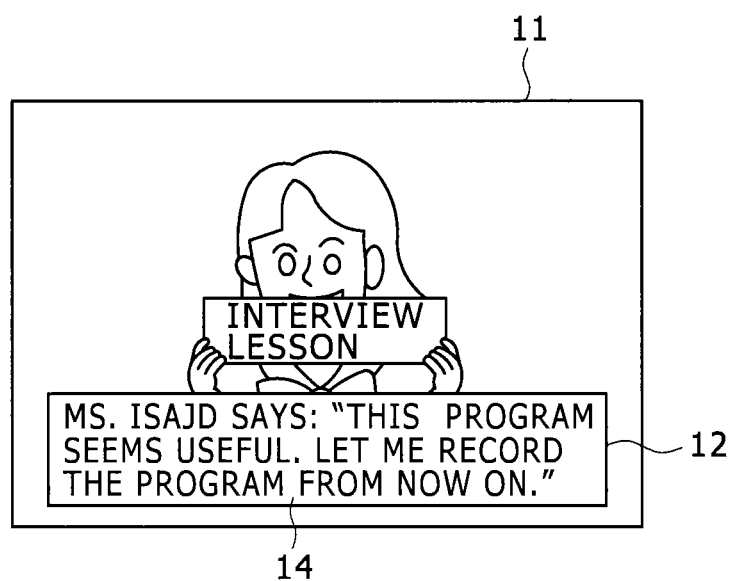

FIGS. 2A and 2B are a plurality of explanatory diagrams each showing a typical screen of the display apparatus 5 employed in the character-information display system according to the first embodiment. To be more specific, FIG. 2A is an explanatory diagram showing a typical screen exhibiting a typical display of a caption 13 whereas FIG. 2B is an explanatory diagram showing a typical screen exhibiting a typical display of a tweet 14.

Here, if there is no new tweet, a caption 13 is displayed in a caption display area 12 on the screen 11 of the display apparatus 5 as shown in FIG. 2A. It is to be noted that, in the typical display shown in FIG. 2A, the caption 13 is displayed at a position allocated to the caption 13 to occupy the entire caption display area 12 so that no tweet can be displayed. If a new tweet 14 exists, on the other hand, the tweet information is acquired and displayed in the caption display area 12 at a position allocated to the caption as shown in FIG. 2B.

As described above, by displaying short-sentence character information of a tweet 14 at a position allocated by a broadcasting station to a caption 13, the character information can be displayed on the screen of the display apparatus 5 without improperly veiling a position on the program image existing in the background of the caption display area 12.

The format of a tweet received by the image processing apparatus 3 from the tweet-information server 1 can be selected and set by the user to operate a remote controller. The format of a tweet includes the size of characters and the color of the tweet. In addition, the user is capable of switching an option to display the character information of a tweet to an option not to display the character information of a tweet and vice versa by entering a command of selecting an item representing one of the options from an option menu.

Figure 3:
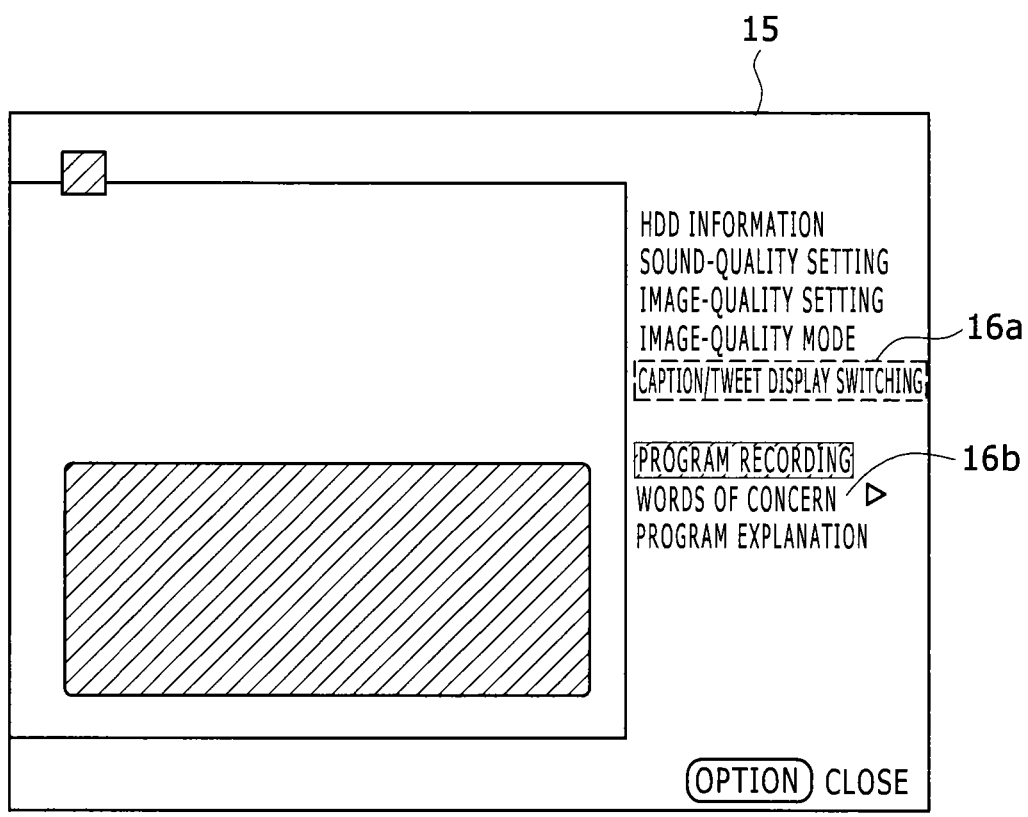
FIG. 3 is an explanatory diagram to be referred to in description of switching from a display of a caption to a display of a tweet and vice versa in accordance with the first embodiment.

FIG. 3 is an explanatory diagram to be referred to in description of switching from a display of a caption to a display of a tweet and vice versa in accordance with the first embodiment.

As an option item of an option-menu screen 16, an item referred to as a caption/tweet display switching option 16a is provided. It is possible to provide a toggle mechanism described as follows. As a default, a caption is displayed. When the item referred to as the caption/tweet display switching option 16a is clicked, the display is switched to a tweet. When the item referred to as the caption/tweet display switching option 16a is clicked again, the display is switched back to a caption. It is to be noted that an option item referred to as words of concern 16b is used for the purpose of creating specification information serving as a hash-tag in this embodiment on the basis of characters included in EPG (Electronic Program Guide) information also referred to as SI information, and obtaining tweet information related to a broadcast program. Details of the words of concern 16b will be described later.

Typical Configuration of the Servers

Next, the configuration of the tweet-information server 1 and the specification-information server 2 is explained as follows.

Figure 4:
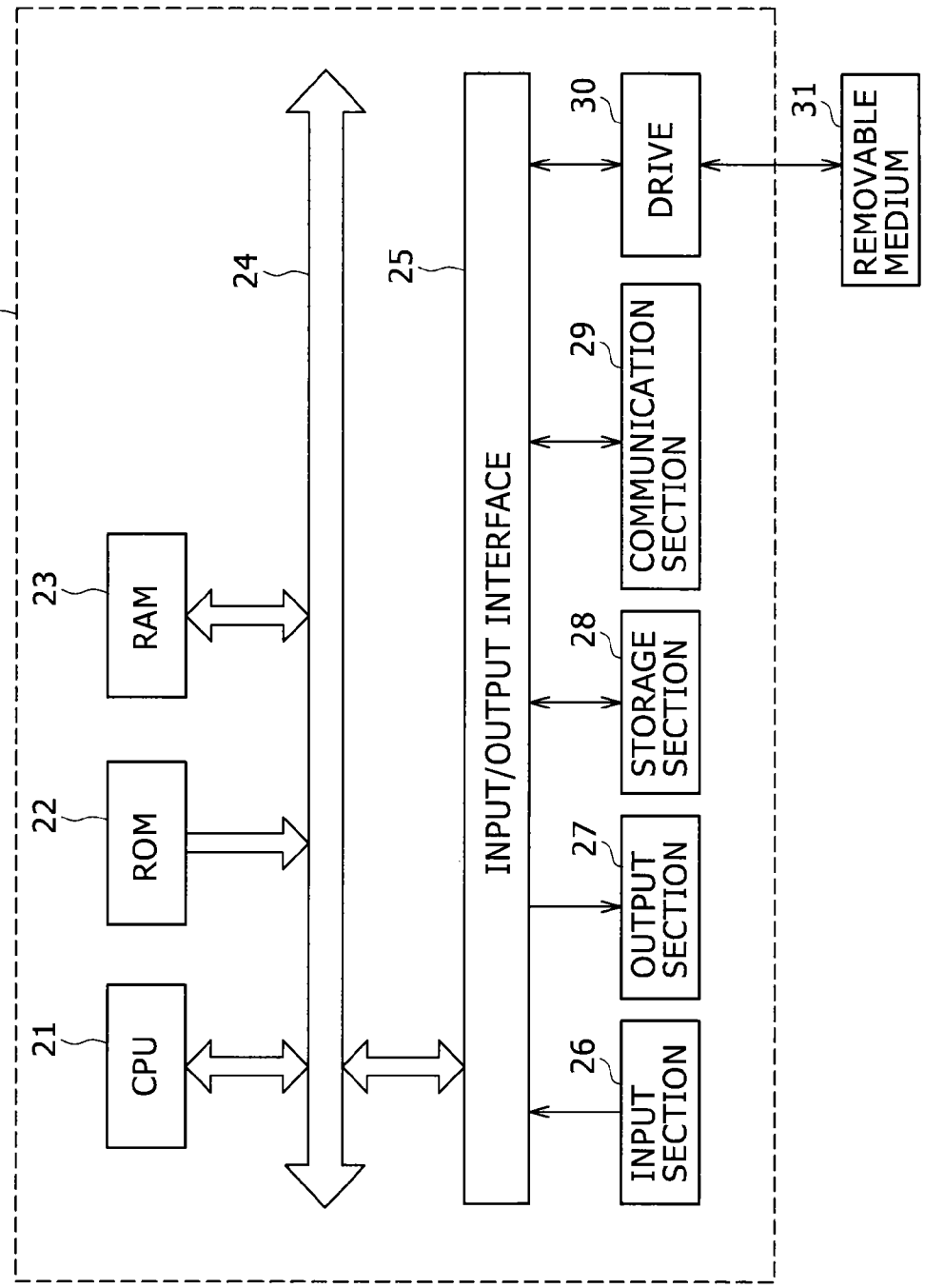
FIG. 4 is a block diagram showing a typical internal configuration of a computer employed in each server included in the character-information display system according to the first embodiment.

Each of the tweet-information server 1 and the specification-information server 2 can be implemented typically as a general-purpose computer. FIG. 4 is a block diagram showing a typical internal configuration of hardware of the general-purpose computer referred to hereafter simply as a computer 20.

As shown in the figure, the computer 20 employs a CPU (Central Processing Unit) 21, a ROM (Read-Only Memory) 22 and a RAM (Random-Access Memory) 23 which are connected to each other by a bus 24.

The bus 24 is also connected to an input/output interface 25. The input/output interface 25 is connected to an input section 26, an output section 27, a storage section 28, a communication section 29 and a drive 30.

The input section 26 includes a keyboard, a mouse and a microphone whereas the output section 27 includes a display unit and a speaker. The storage section 28 includes a hard disk and a nonvolatile memory. The communication section 29 is a network interface. On the drive 30, a removable recording medium 31 is mounted and driven. The removable recording medium 31 can be a magnetic disk, an optical disk, a magnetic optical disk or a semiconductor memory.

In the computer 20 having the configuration described above, the CPU 21 executes programs in order to carry out the processing described above. The programs executed by the CPU 21 are typically programs loaded into the RAM 23 from the storage section 28 by way of the input/output interface 25 and the bus 24.

The programs to be executed by the CPU 21 employed in the computer 20 can be presented to the user by storing the programs in the removable recording medium 31 used as a package recording medium. In addition, the programs can also be presented to the user through a wire or radio transmission medium such as a local area network, the Internet or a digital broadcast.

In the computer 20, the programs can be installed in the storage section 28 by transferring the programs from the removable recording medium 31 to the storage section 28 by way of the drive 30 and the input/output interface 25 when the removable recording medium 31 is mounted on the drive 30. In addition, the programs can be downloaded by the communication section 29 by way of the wire or radio transmission medium. Then, the programs are installed in the storage section 28 by transferring the programs from the communication section 29 to the storage section 28 by way of the input/output interface 25. On top of that, the programs can be stored in advance in the ROM 22 or the storage section 28.

When the tweet-information server 1 having the configuration described above receives a URL created on the basis of a hash-tag from the image processing apparatus 3, the CPU 21 searches pieces of character information stored in the storage section 28 for specific character information specified by the URL. If the character information specified by the URL is found in the search, the character information is transmitted to the image processing apparatus 3 by way of the network 4.

In addition, it is possible to provide a configuration in which, when the specification-information server 2 receives a request for transmission of a specification-information table like Table 1 from the image processing apparatus 3, the CPU 21 reads out the specification-information table from the storage section 28 and transmits the table to the image processing apparatus 3. As an alternative configuration, the image processing apparatus 3 may make a request for specification information such as a hash-tag for a specific broadcasting station. That is, in the alternative configuration, when the specification-information server 2 receives a request for transmission of specification information from the image processing apparatus 3, the CPU 21 reads out the specification information for the broadcasting station from the storage section 28 and transmits the information to the image processing apparatus 3.

Typical Configuration of the Image Processing Apparatus

Next, a typical configuration of the image processing apparatus 3 is explained as follows.

Figure 5:
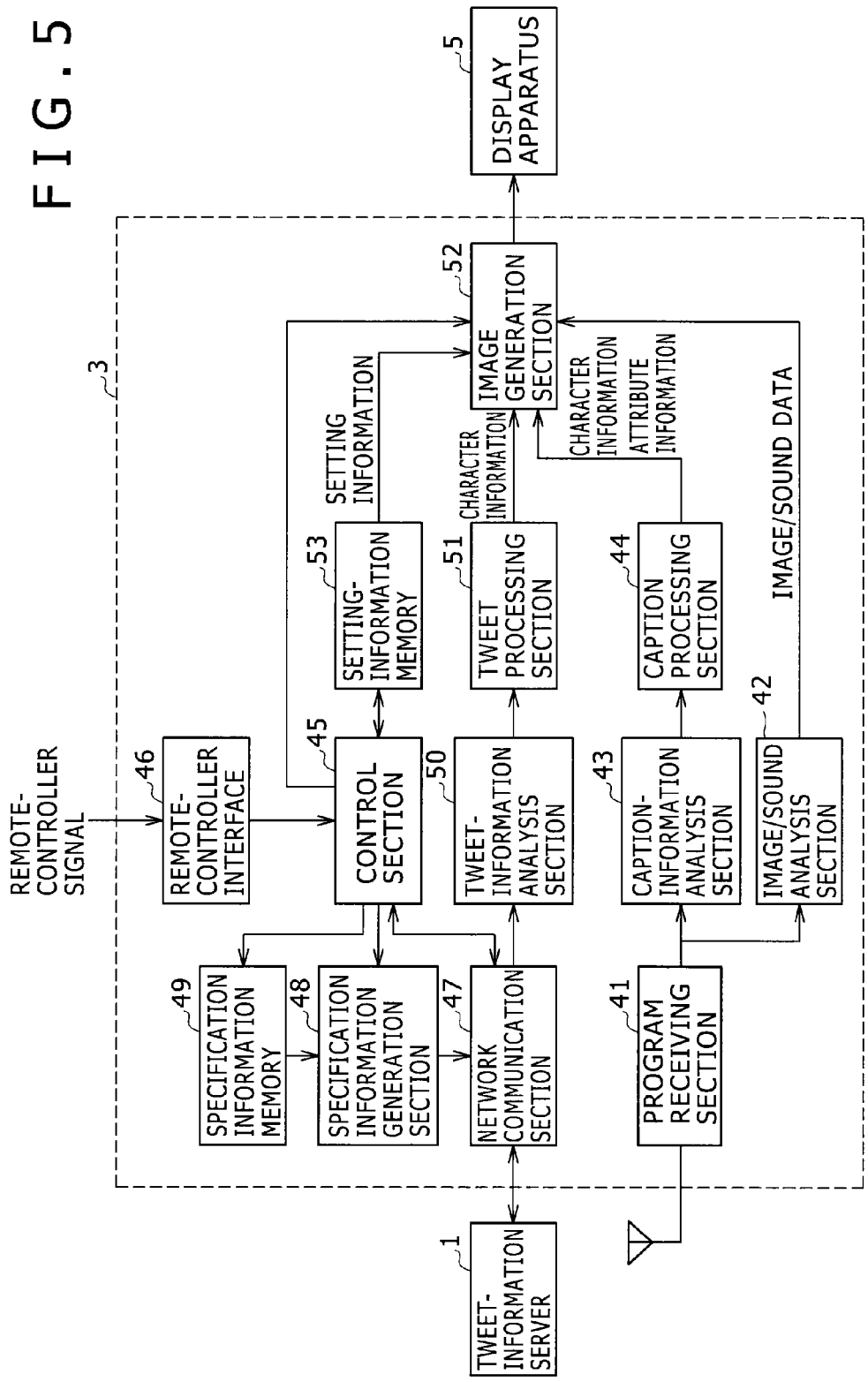
FIG. 5 is a block diagram showing a typical internal configuration of an image processing apparatus included in the character-information display system according to the first embodiment.

FIG. 5 is a block diagram showing a typical internal configuration of the image processing apparatus 3.

The image processing apparatus 3 is divided into two large blocks, that is, a block for carrying out processing on a broadcast program and a block for carrying out processing on tweet information.

The block for carrying out processing on a broadcast program includes a program receiving section 41, an image/sound analysis section 42, a caption-information analysis section 43 and a caption processing section 44.

On the other hand, the block for carrying out processing on tweet information includes a network communication section 47, a specification-information generation section 48, a specification-information memory 49, a tweet-information analysis section 50 and a tweet processing section 51. The network communication section 47 is a typical communication section.

In addition, the image processing apparatus 3 also has a control section 45, a remote-controller interface 46, a set-information memory 53 and an image generation section 52.

The program receiving section 41 is a typical example of a program receiving section having the function of the so-called tuner. The program receiving section 41 receives TV broadcast waves conveying a broadcast program through an antenna, supplying the received broadcast program to the image/sound analysis section 42 and the caption-information analysis section 43.

The image/sound analysis section 42 is a typical example of a video-picture extraction section for analyzing the broadcast program received by the program receiving section 41, extracting image and sound data from the program and outputting the data to the image generation section 52.

The caption-information analysis section 43 and the caption processing section 44 are typical examples of configuration elements composing a caption extraction section.

The caption-information analysis section 43 analyzes a broadcast program received by the program receiving section 41, extracts caption information from the program and supplies the information to the caption processing section 44. The caption processing section 44 extracts character information and attribute information from the caption information extracted by the caption-information analysis section 43 and outputs the character information and the attribute information to the image generation section 52. The character information is a string of characters.

As an example, the character information of a caption corresponds to first and second caption sentences of an ARIB (Association of Radio Industries and Businesses) standard. On the other hand, the attribute information of a caption corresponds to caption management data of the ARIB standard. In the following description, the first caption sentence is also referred to as a first caption or caption 1 whereas the second caption sentence is also referred to as a second caption or caption 2. On the other hand, the caption management data for the first caption sentence is also referred to as first attribute information or attribute 1 whereas the caption management data for the second caption sentence is also referred to as second attribute information or attribute 2.

The network communication section 47 is a typical example of a communication section for carrying out communications with the external network 4 employed in the character-information display system shown in FIG. 1. A typical example of the network 4 is the Internet.

The specification-information generation section 48 analyzes the contents of the specification-information table acquired from the specification-information server 2 or the like. As described before, the specification-information table is a table in which a plurality of pieces of specification information which are typically hash-tags have been registered. Then, the specification-information generation section 48 extracts specification information from the specification-information table. The specification information is information used for specifying broadcasting-station information and attached character information, which are included in information on a broadcast program, and used for acquiring the broadcasting-station information and the attached character information. Subsequently, from the specification information which is typically a hash-tag, the specification-information generation section 48 creates a URL for tweet information to be acquired from the tweet-information server 1.

The specification-information memory 49 is a memory used for storing the specification-information table such as Table 1. It is also possible to provide a configuration in which the specification-information generation section 48 creates specification information by referring to a broadcasting station and specification information which have been registered in the specification-information table. As described earlier, a typical example of the specification information is a hash-tag. In addition, the specification-information memory 49 is also used for storing user set information which is any arbitrary specification information set by the user to serve as information on, among others, a persona and/or a genre.

The tweet-information analysis section 50 and the tweet processing section 51 are typical examples of configuration elements composing a character-information acquisition section. The tweet-information analysis section 50 and the tweet processing section 51 acquire character information serving as a tweet created as information related to a broadcast program from the tweet-information server 1 through the network communication section 47. In the tweet-information server 1, a plurality of pieces of character information each serving as a tweet have been registered.

The control section 45 receives a remote-controller signal such as an infrared light ray from a remote controller not shown in the figure through the remote-controller interface 46. The remote controller is a typical example of an operation section. In addition, the control section 45 controls blocks in the image processing apparatus 3 on the basis of the remote-controller signal. For example, the control section 45 controls data communications carried out by the network communication section 47 and controls processing carried out by the specification-information generation section 48 and the specification-information memory 49 to generate specification information. In addition, the control section 45 also stores set information in the set-information memory 53 in accordance with an operation carried out by the user and informs the image generation section 52 of the contents of a direct operation signal. Typically, the control section 45 is implemented as an MPU (Micro-Processing Unit).

The remote-controller interface 46 receives the remote-controller signal such as an infrared light ray from the remote controller not shown in the figure, converts the remote-controller signal into an electrical signal and outputs the electrical signal to the control section 45.

The set-information memory 53 is a memory used for storing various kinds of set information. One piece of set information is information used for switching the display from a caption to a tweet or vice versa. If first and second captions have been set for a broadcast program, another piece of set information is used for selecting one of the first caption and the second caption.

In accordance with information stored in the set-information memory 53 as the set information used for switching the display from a caption to a tweet or vice versa, the image generation section 52 inserts character information of a caption or character information of a tweet into a predetermined position in a caption display area and generates an image including the character information. Then, the image generation section 52 outputs the generated image to the display apparatus 5.

Configuration of the Image Generation Section

Figure 6:
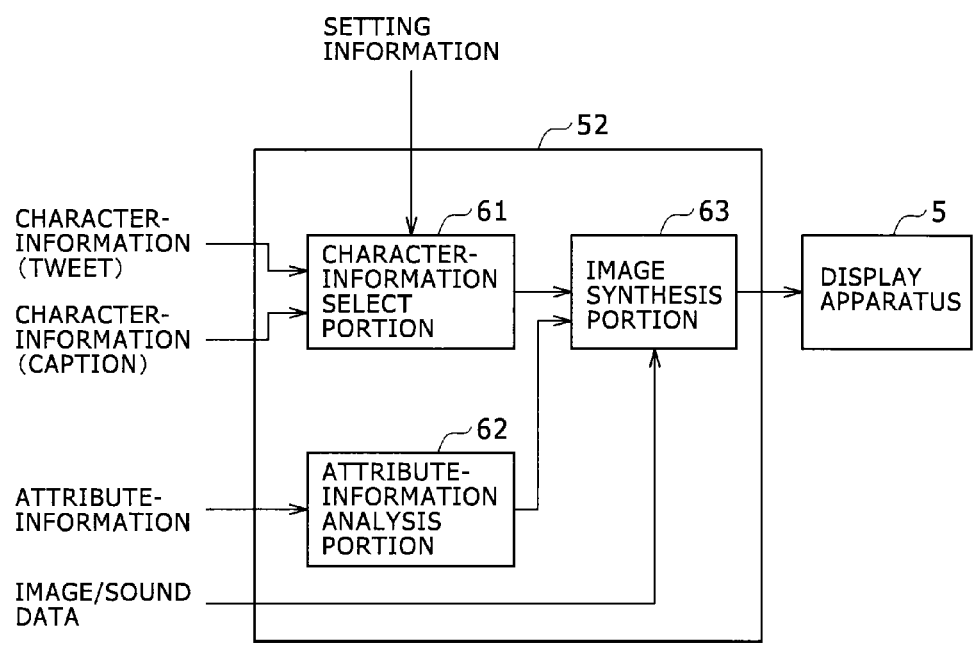
FIG. 6 is a block diagram showing a typical internal configuration of an image generation section employed in the image processing apparatus according to the first embodiment.

FIG. 6 is a block diagram showing a typical internal configuration of the image generation section 52 according to the first embodiment.

As shown in the figure, the image generation section 52 employs a character-information select portion 61, an attribute-information analysis portion 62 and an image synthesis portion 63.

On the basis of set information, the character-information select portion 61 selects character information received from the caption processing section 44 as character information of a caption or character information received from the tweet processing section 51 as character information of a tweet, and supplies the selected character information to the image synthesis portion 63.

The attribute-information analysis portion 62 analyzes the contents of attribute information received from the caption processing section 44 in order to find out desired information, and outputs the desired information to the image synthesis portion 63. The desired information includes the number of used captions, the size of the caption display area and the position of a caption in the caption display area.

On the basis of the position information included in the attribute information as the position of a caption in the caption display area, the image synthesis portion 63 inserts the character information of a caption or a tweet into a predetermined position included in the caption display area of image/sound data to be input as a position provided for character information and generates an image. Then, the image synthesis portion 63 provides the display apparatus 5 with the generated image including the character information already inserted into the predetermined position in the caption display area.

Processing of the Image Generation Section

Figure 7:
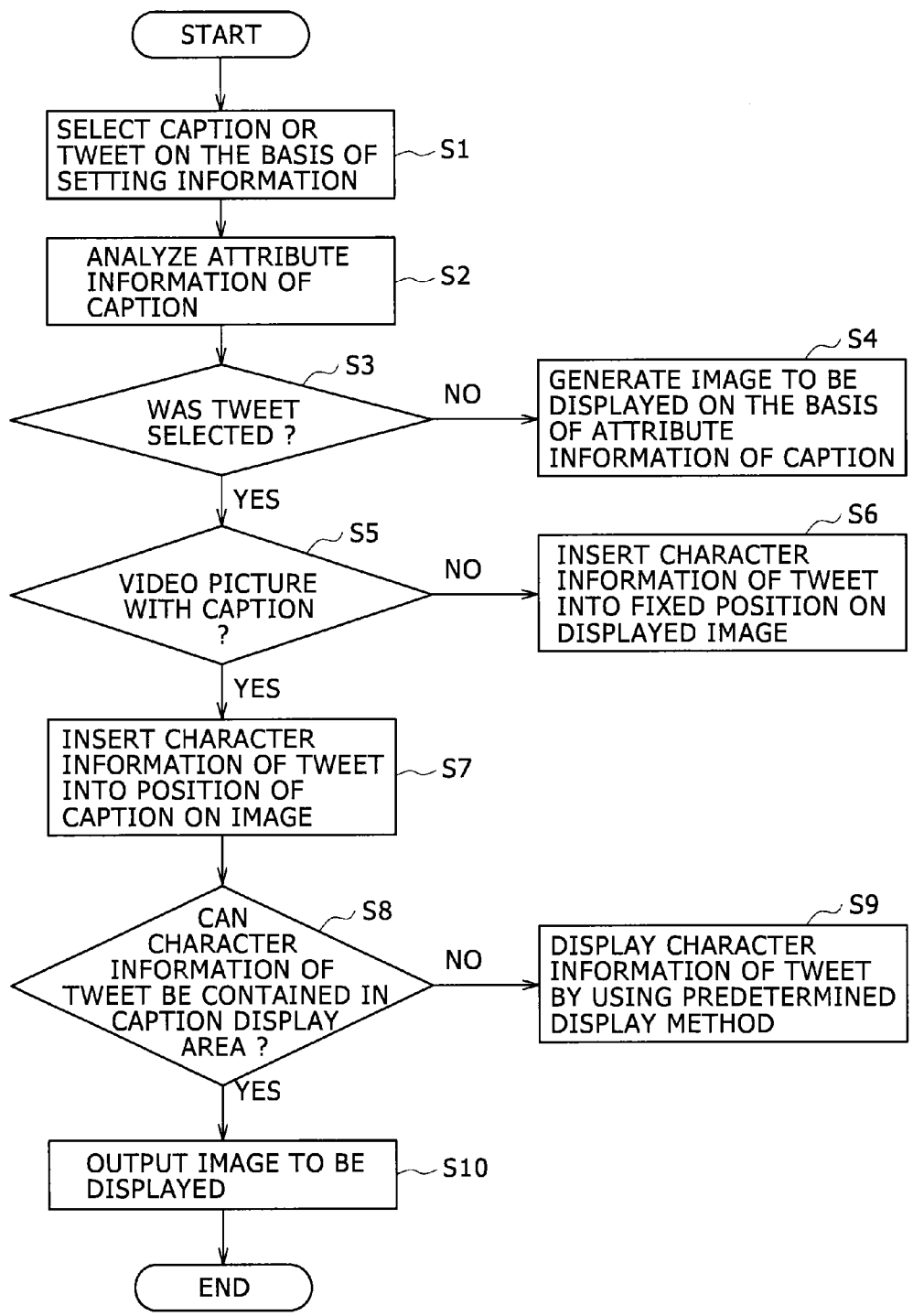
FIG. 7 shows a flowchart representing typical processing carried out by the image generation section to display a tweet in accordance with the first embodiment.

FIG. 7 shows a flowchart representing typical processing carried out by the image generation section 52 to display a tweet in accordance with the first embodiment.

As shown in the figure, the flowchart begins with a step S1 at which, first of all, the character-information select portion 61 employed in the image generation section 52 selects a caption or a tweet on the basis of set information. Concurrently with the process performed at this step S1, the attribute-information analysis portion 62 analyzes attribute information of the caption at the step S2.

Then, at the next step S3, the image generation section 52 determines whether or not the character-information select portion 61 has selected a tweet at the step S1. If the image generation section 52 determines at the step S3 that the character-information select portion 61 has selected no tweet at the step S1, the flow of the processing goes on to a step S4 at which the image synthesis portion 63 generates an image into which a caption is inserted on the basis of the attribute information of the caption, and outputs the image to the display apparatus 5.

If the image generation section 52 determines at the step S3 that the character-information select portion 61 has selected a tweet at the step S1, on the other hand, the flow of the processing goes on to a step S5 at which the image synthesis portion 63 determines whether or not the received broadcast program is a video picture with a caption on the basis of the attribute information of the broadcast program. If the image synthesis portion 63 determines at the step S5 that the received broadcast program is a video picture with no caption, the flow of the processing goes on to a step S6 at which the image synthesis portion 63 inserts the character information of the tweet into a fixed position on the image to be displayed, supplying the image and the tweet to the display apparatus 5. In the case of a broadcast program with no caption or in the case of a display between CMs (commercial messages) for example, the character information of the tweet is displayed at the fixed position on the displayed image.

If the image synthesis portion 63 determines at the step S5 that the received broadcast program is a video picture with a caption, on the other hand, the flow of the processing goes on to a step S7 at which, on the basis of a position specified in the attribute information as the position of the caption in the caption display area, the image synthesis portion 63 inserts the character information of the tweet into the position of the caption on the image to be displayed.

In this case, the image synthesis portion 63 determines whether or not the character information of the tweet to be inserted into the image can be contained in the caption display area at the next step S8. If the image synthesis portion 63 determines at the step S8 that the character information of the tweet may not be contained in the caption display area, the flow of the processing goes on to a step S9 at which the image synthesis portion 63 inserts the character information of the tweet into the caption display area in the image to be displayed by adopting another method determined in advance, and outputs the image to the display apparatus 5.

Typically, the maximum number of characters composing a tweet that can be registered in the TWITTER is 140. Thus, the character string of a tweet may not all be contained in the caption display area so that, conceivably, a portion of the tweet may not be displayed in the caption display area. In this case, on the basis of the size of the characters of the tweet and the size of the caption display area, the image synthesis portion 63 computes the number of displayable characters in the character string of the tweet, and displays only the displayable characters beginning with the start character of the character string. If the character string of the tweet may not all be contained in the caption display area, the displayable characters are displayed by terminating the displayable characters with the characters " . . . " indicating that a portion of the character string may not be displayed. In this way, the user can be made aware of the fact that a portion of the character string of the tweet may not be displayed. Thus, if the user desires to view the continuation of the displayable portion included in the character string of the tweet, the user can take an action by directly viewing the tweet registered in the tweet-information server 1.

As an alternative, the image synthesis portion 63 may increase the number of rows in the caption display area to a value greater than a row count prescribed in advance for the caption display area, and display the character information of the tweet by making use of all the rows including the additional ones. As another alternative, the image synthesis portion 63 may display the character information of the tweet in the caption display area by rolling up or scrolling the tweet.

If the image synthesis portion 63 determines at the step S8 that the character information of the tweet to be inserted into the image can be contained in the caption display area, on the other hand, the flow of the processing goes on to a step S10 at which the image synthesis portion 63 provides the display apparatus 5 with the image including the character information of the tweet inserted into the position of the caption. Then, the processing represented by this flowchart is terminated at the end of the process carried out at the step S10.

Tweet Acquisition Method

Next, the following description explains methods each adopted for acquiring a tweet from the tweet-information server 1.

Figure 8:
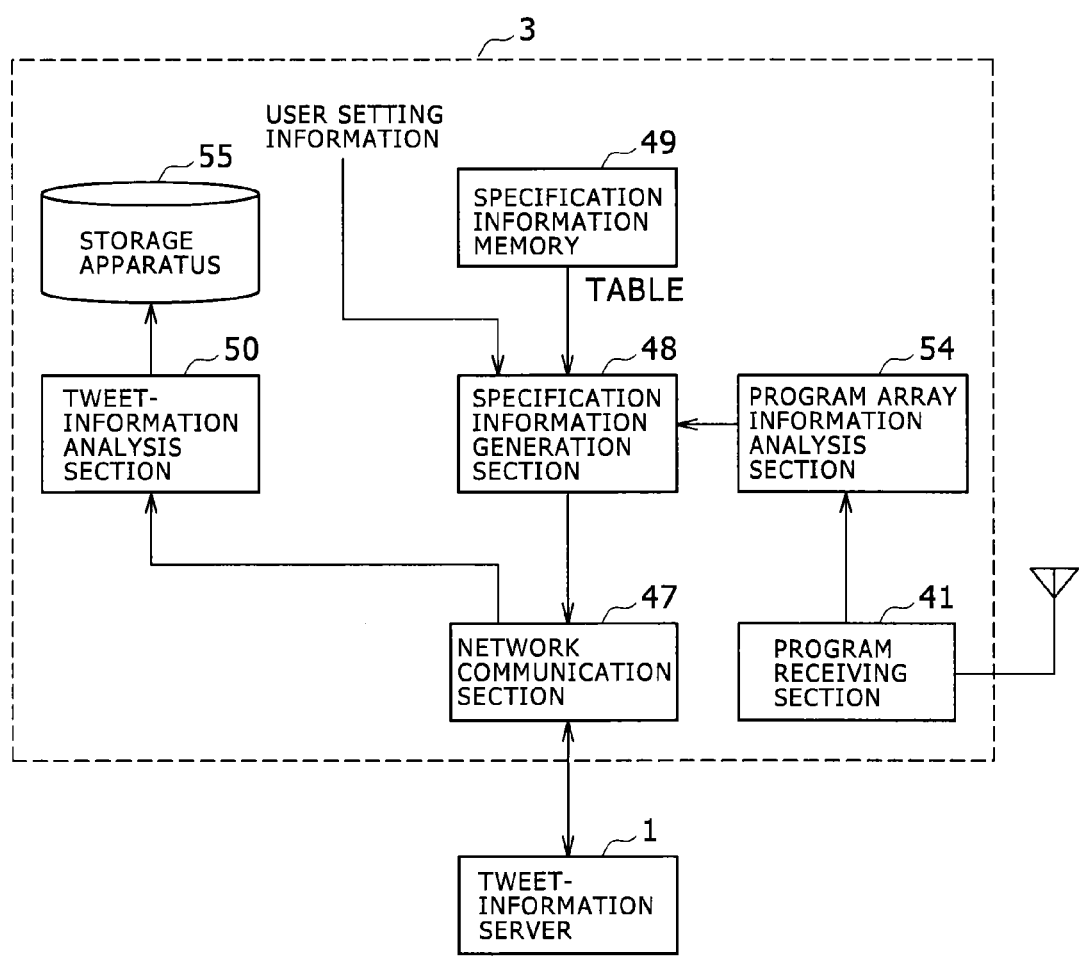
FIG. 8 is a block diagram showing only main sections included in a typical internal configuration of the image processing apparatus according to the first embodiment to serve as sections for acquiring a tweet from a tweet information server.

FIG. 8 is a block diagram showing only main sections included in a typical internal configuration of the image processing apparatus 3 according to the first embodiment to serve as sections for acquiring a tweet from the tweet information server 1. Every section included in the typical configuration shown in FIG. 8 to serve as a section identical with a specific one included in the typical configuration shown in FIG. 5 is denoted by the same reference numeral as the specific one.

In accordance with a first tweet acquisition method, a broadcasting station is identified from information on a broadcast program, and a tweet is acquired on the basis of specification information for the broadcasting station.

A program array information analysis section 54 included in the configuration shown FIG. 8 analyzes program array information included in a broadcast program received by the program receiving section 41 and identifies the broadcasting station of the broadcast program from the program array information such as SI information. Then, the program array information analysis section 54 supplies information on the broadcasting station to the specification-information generation section 48 also included in the configuration shown FIG. 8. The specification-information generation section 48 searches the specification-information table stored in the specification-information memory 49 for specification information associated with the identified broadcasting station. For example, the specification-information generation section 48 finds specification information of #AAA shown in Table 1 in the search as specification information associated with the identified broadcasting station. Then, the specification-information generation section 48 transmits a URL based on this specification information to the tweet-information server 1 by way of the network communication section 47. In response to the URL transmitted by the specification-information generation section 48, the tweet-information server 1 transmits data including a tweet to the image processing apparatus 3. Then, the tweet-information analysis section 50 employed in the image processing apparatus 3 receives and analyzes the data to extract the character information of the tweet associated with the broadcasting station. Subsequently, the tweet-information analysis section 50 supplies the character information of the tweet to a storage apparatus 55.

As described above, in accordance with this first tweet acquisition method, a broadcasting station is identified from information on a presently viewed program being broadcasted by the station, and a tweet associated with the station can be acquired on a real-time basis on the basis of specification information registered in the specification-information table as the specification information for the station.

In accordance with a second tweet acquisition method to be described below, on the other hand, specification information is generated on the basis of user set information which is information set by the user, and a tweet can be acquired as follows.

The user provides the specification-information generation section 48 with user set information such as jishin (earthquake) set in accordance with an operation carried out by the user. As an alternative, the specification-information generation section 48 makes use of user set information stored in advance in the specification-information memory 49. As explained before, set by the user, the user set information is arbitrary information such as a persona appearing on a broadcast program or a genre. The specification-information generation section 48 generates specification information such as #jishin for the user set information and transmits a URL based on the specification information to the tweet-information server 1 by way of the network communication section 47. In response to the URL received from the specification-information generation section 48, the tweet-information server 1 transmits data including a tweet to the image processing apparatus 3. Then, the tweet-information analysis section 50 employed in the image processing apparatus 3 receives and analyzes the data to extract the character information of the tweet associated with the user set information. Subsequently, the tweet-information analysis section 50 supplies the character information of the tweet to the storage apparatus 55.

As described above, in accordance with this second tweet acquisition method, a tweet associated with specification information generated on the basis of user set information can be acquired on a real-time basis as a tweet not necessarily related to information on a broadcast program being viewed presently.

In addition, a tweet can also be acquired by combining the first and second tweet acquisition methods. In this case, a tweet can be obtained under a finely adjusted condition. For example, specification information generated in accordance with the first tweet acquisition method is added to specification information generated in accordance with the second tweet acquisition method, or specification information generated in accordance with the first tweet acquisition method is multiplied by specification information generated in accordance with the second tweet acquisition method.

It is to be noted that the storage apparatus 55 is an external nonvolatile data recording apparatus having a large storage capacity. Typical examples of the storage apparatus 55 are a hard disk, a semiconductor memory and a removable recording medium.

Figure 9:
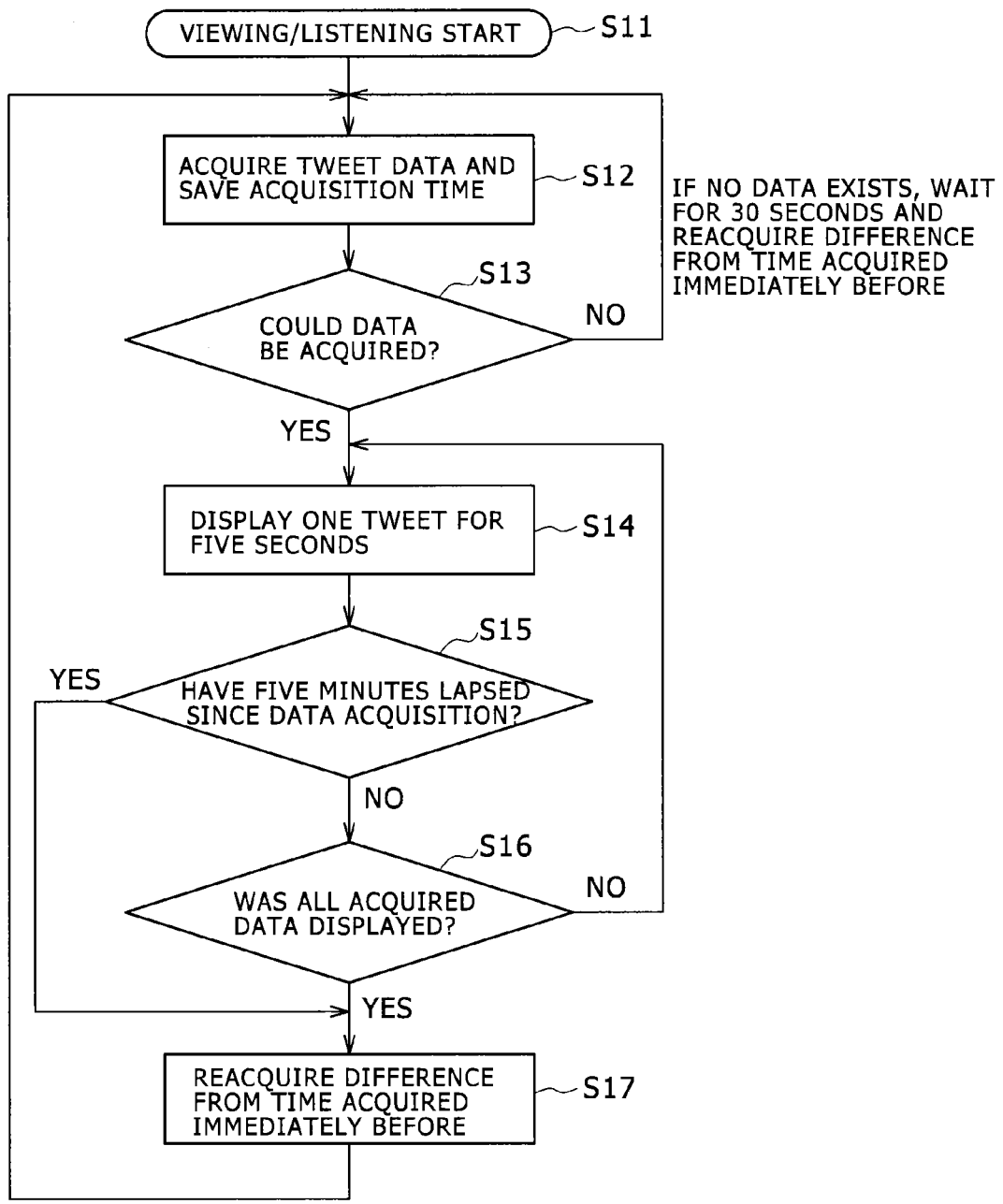
FIG. 9 shows a flowchart representing typical processing carried out by the image generation section to acquire a tweet in accordance with the first embodiment.

FIG. 9 shows a flowchart representing typical processing carried out by the image generation section 52 employed in the image processing apparatus 3 to acquire a tweet in accordance with the first embodiment.

As shown in the figure, the flowchart begins with a step S11 at which, first of all, the control section 45 employed in the image processing apparatus 3 detects an operation which is carried out by the user on the image processing apparatus 3 to start viewing a broadcast program.

After detecting the operation to start the viewing of a broadcast program, at the next step S12, the control section 45 carries out control to acquire a tweet regarding the broadcast program being viewed from the tweet-information server 1, storing the tweet and the acquisition time of the tweet in the storage apparatus 55.

Then, at the next step S13, the control section 45 determines whether or not the data of the tweet has been acquired successfully at the step S12. If the control section 45 determines at the step S13 that the data of the tweet has not been acquired successfully at the step S12, the flow of the processing goes back to the step S12 at which the control section 45 again carries out control to reacquire a tweet regarding the broadcast program being viewed from the tweet-information server 1. To be more specific, if the control section 45 determines at the step S13 that the data of the tweet has not been acquired successfully at the step S12, the flow of the processing goes back to the step S12 at which the control section 45 again carries out control to reacquire a tweet regarding the broadcast program being viewed from the tweet-information server 1 after waiting for typically a time period of 30 seconds to elapse since the preceding acquisition time stored in the storage apparatus 55 as a tweet for a difference from the preceding acquisition time.

If the control section 45 determines at the step S13 that the data of the tweet has been acquired successfully at the step S12, on the other hand, the flow of the processing goes on to a step S14 at which the control section 45 controls the image generation section 52 to output an image to the display apparatus 5 so that the display apparatus 5 displays the tweet for a display time period of five seconds. It is to be noted that the display time period of five seconds is a typical time period. That is, the tweet may be displayed for a display time period different from five seconds.

Then, at the next step S15, the control section 45 determines whether or not a time period of five minutes has lapsed since the acquisition of the data of the tweet. If the control section 45 determines at the step S15 that the time period of five minutes has lapsed since the acquisition of the data of the tweet, the flow of the processing goes on to a step S17. The time period of five minutes is adopted as a criterion because, if there are a number of tweets, it undesirably takes at least five minutes to complete an operation to display all the tweets so that less recent information is displayed. In this way, it is possible to monitor whether or not a less recent tweet remains undisplayed during the time period of five minutes. Thus, a recent tweet can always be acquired. It is to be noted that the time period of five minutes is a typical time period. That is, the time period can be other than five minutes.

If the control section 45 determines at the step S15 that the time period of five minutes has not lapsed since the acquisition of the data of the tweet, the flow of the processing goes on to a step S16 at which the control section 45 determines whether or not the data of all the acquired tweets has been output from the image generation section 52 to the display apparatus 5 to be displayed on the display apparatus 5. If the control section 45 determines at the step S16 that the data of all the acquired tweets has not been displayed on the display apparatus 5, the flow of the processing goes back to the step S14 at which the control section 45 carries out control to display the data of the remaining tweets.

If the control section 45 determines at the step S16 that the data of all the acquired tweets has been displayed on the display apparatus 5, on the other hand, the flow of the processing goes on to the step S17 cited above. At the step S17, the control section 45 carries out control to reacquire the data of tweets for the difference from the preceding acquisition time. Then, the flow of the processing goes back to the step S12 at which the control section 45 carries out control to acquire a tweet regarding the broadcast program being viewed from the tweet-information server 1, storing the tweet and the acquisition time of the tweet in the storage apparatus 55.

If the tweet-information server 1 is out of order or if a communication failure occurs in the network 4, no tweet data is displayed. The event of such a breakdown or the event of such a failure is equivalent to a case in which the number of acquired tweets is found to be 0 in the determination process carried out at the step S13.

In accordance with the first embodiment described above, by making use of information on the position of a caption, the character information of a tweet is displayed at the position of the caption so that it is not necessary to provide another window to be used for displaying the tweet.

In addition, since the character information of a tweet is displayed at a position determined by a broadcasting station as the position of a caption, it is possible to display the character information of a tweet without improperly veiling a position on the program image existing in the background of an area allocated to the caption.

1-1: Modified Version

Figure 10:
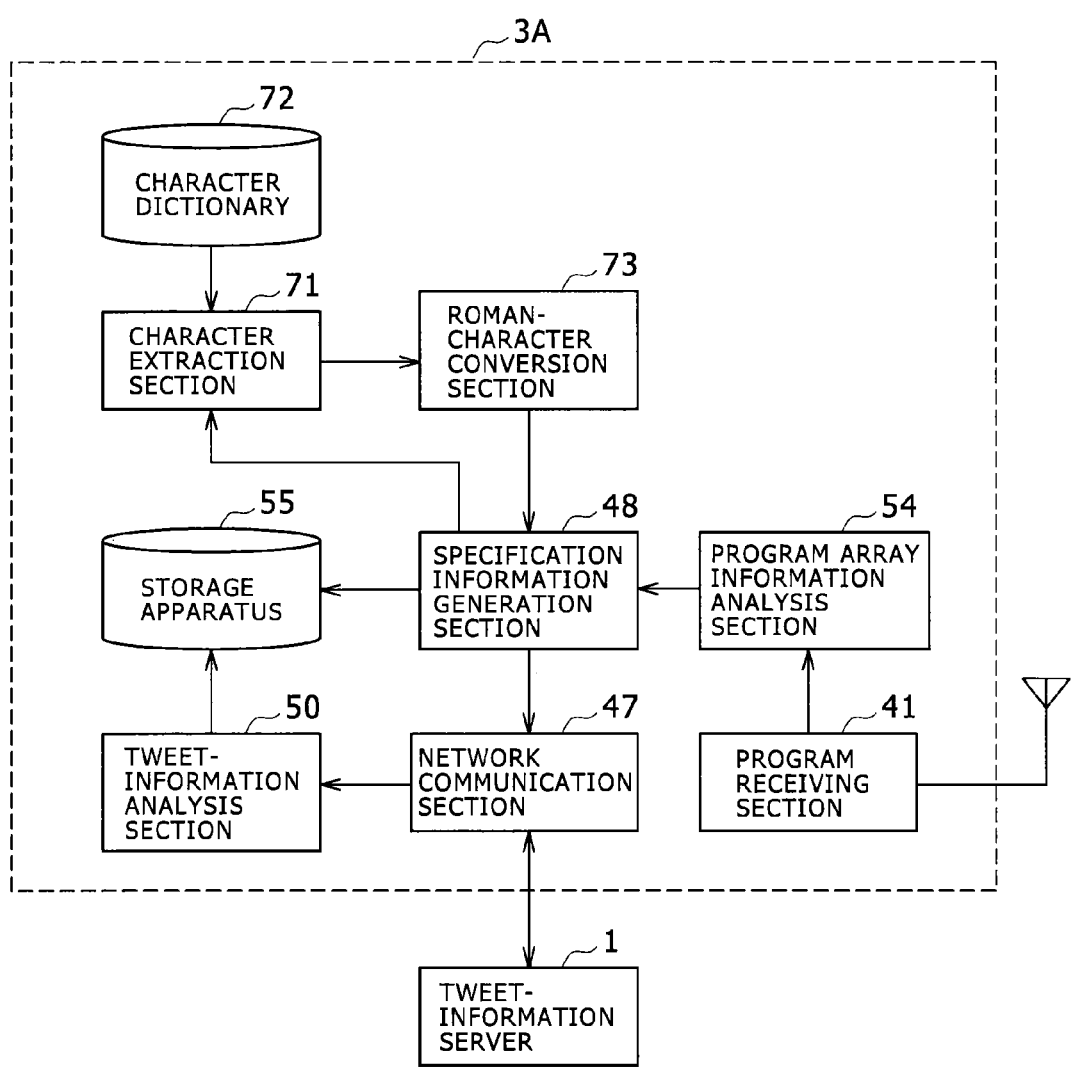
FIG. 10 is a block diagram showing main sections composing a modified version of the image processing apparatus according to the first embodiment.

FIG. 10 is a block diagram showing main sections composing a modified version of the image processing apparatus 3 according to the first embodiment.

The modified version is configured to generate specification information which is a hash-tag in the case of this modified version on the basis of characters included in EPG information (or SI information) transmitted from a broadcasting station along with a broadcast program, and acquire tweet information regarding the broadcast program. The following description explains the modified version by focusing the discussion on differences between the image processing apparatus 3A shown in FIG. 10 and the image processing apparatus 3 shown in FIGS. 5 and 8.

In comparison with the image processing apparatus 3, the image processing apparatus 3A is configured to newly include a character extraction section 71, a character dictionary 72 and a Roman-character conversion section 73.

A specification-information generation section 48 acquires character information extracted by a program array information analysis section 54 from program array information and supplies the character information to the character extraction section 71. The character information includes kanji and hiragana characters.

The character extraction section 71 compares the character information acquired by the specification-information generation section 48 with characters registered in advance in the character dictionary 72. If the character information acquired by the specification-information generation section 48 includes a character registered in advance in the character dictionary 72, the character extraction section 71 supplies the character to the Roman-character conversion section 73. The character dictionary 72 is typically a nonvolatile data recording apparatus which can be the storage apparatus 55.

The Roman-character conversion section 73 converts a kanji or hiragana character into katakana characters and converts the katakana characters into Roman characters. Then, the Roman-character conversion section 73 outputs the Roman characters to the specification-information generation section 48.

The specification-information generation section 48 creates specification information serving as a hash-tag in this case by, among others, appending the special character "#" to the head of the Roman characters received from the Roman-character conversion section 73. Then, the specification-information generation section 48 transmits a URL based on the specification information to the tweet-information server 1 by way of the network communication section 47. In response to the URL received from the specification-information generation section 48, the tweet-information server 1 transmits tweet information regarding the broadcast program to the image processing apparatus 3A employing the specification-information generation section 48. In this way, the image processing apparatus 3A is capable of acquiring tweet information automatically.

As described above, the modified version of the first embodiment is capable of generating specification information on the basis of characters included in EPG information (or SI information), and automatically acquiring tweet information regarding the broadcast program from the specification information. Thus, the user is capable of easily acquiring tweet information regarding a program other than a program broadcasted by the broadcasting station without the need to create specification information.

2: Second Embodiment

A second embodiment is a typical embodiment applying the principle of the character-information displaying processing, which is carried out by the image processing apparatus 3 shown in FIG. 5 according to the first embodiment, to a video-picture recording apparatus 80.

First of all, the configuration of the video-picture recording apparatus 80 according to the second embodiment is explained as follows.

Figure 11:
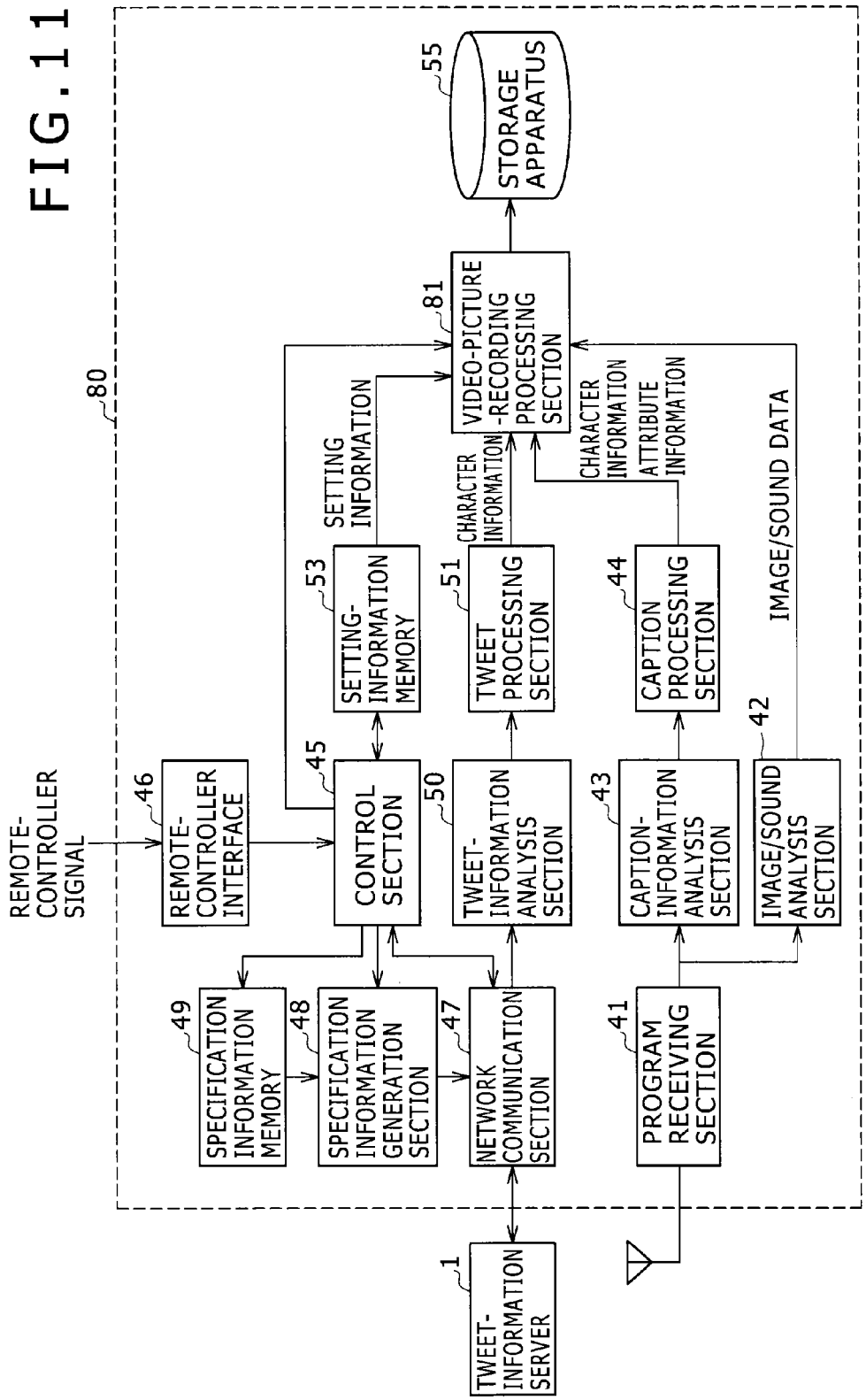
FIG. 11 is a block diagram showing a typical internal configuration of a video-picture recording apparatus according to a second embodiment.

FIG. 11 is a block diagram showing a typical internal configuration of the video-picture recording apparatus 80 according to the second embodiment.

In FIG. 11, each component identical with its counterpart employed in the image processing apparatus 3 shown in FIG. 5 is denoted by the same reference numeral as the counterpart and details of such a component are not explained. The video-picture recording apparatus 80 shown in FIG. 11 employs a video-picture-recording processing section 81 in place of the image generation section 52 employed in the image processing apparatus 3 shown in FIG. 5, and employs a storage apparatus 55 serving as the recipient of the output of the video-picture-recording processing section 81 in place of the display apparatus 5 employed in the image processing apparatus 3. The remaining components other than the video-picture-recording processing section 81 and the storage apparatus 55 have configurations common to the video-picture recording apparatus 80 and the image processing apparatus 3.

Next, the configuration of the video-picture-recording processing section 81 employed in the second embodiment is explained as follows.

Figure 12:
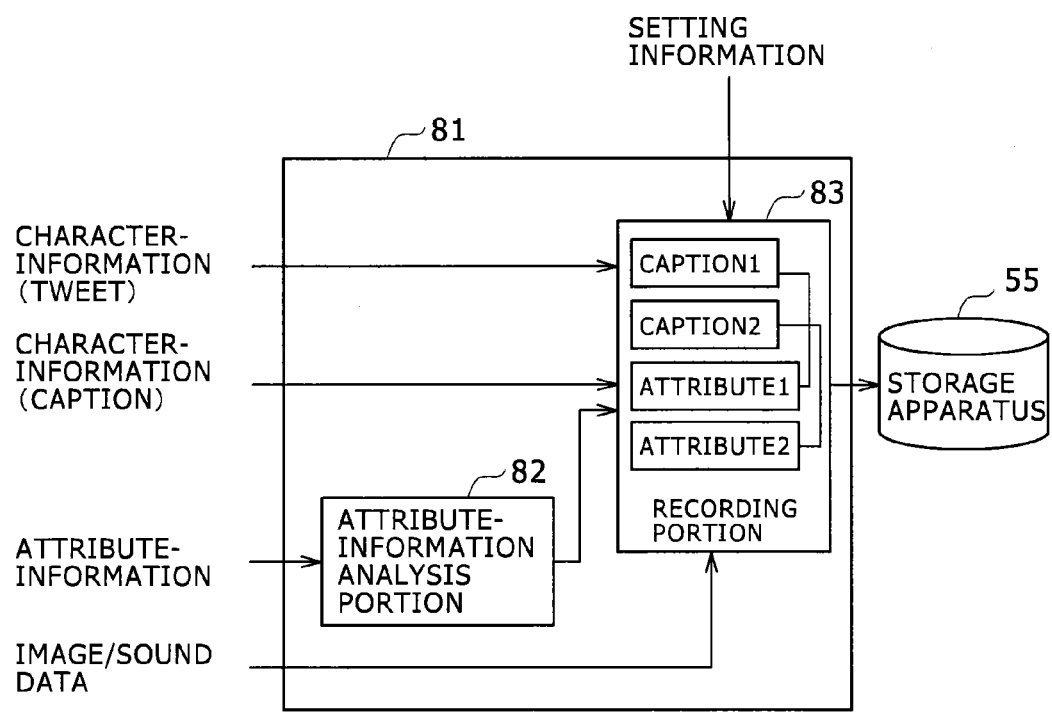
FIG. 12 is a block diagram showing a typical internal configuration of a video-picture-recording processing section employed in the video-picture recording apparatus according to the second embodiment.

FIG. 12 is a block diagram showing a typical internal configuration of the video-picture-recording processing section 81. As shown in the figure, the video-picture-recording processing section 81 is configured to include main sections which are an attribute-information analysis portion 82 and a recording portion 83. It is assumed that, in this typical configuration, the character information of a tweet is inserted into a first caption whereas the character information of a caption is inserted into a second caption.

The attribute-information analysis portion 82 has the same function as the attribute-information analysis portion 62 shown in FIG. 6. That is, the attribute-information analysis portion 82 analyzes the contents of attribute information received from the caption processing section 44 to find out desired information, and outputs the desired information to the recording portion 83. The desired information includes the number of used captions, the size of the caption display area and the position of a caption in the caption display area.

On the basis of the position information included in the attribute information as the position of a caption in the caption display area, the recording portion 83 inserts the character information of a caption or a tweet into a predetermined position of character information, which is included in the caption display area of image/sound data, and generates an image. Then, the recording portion 83 provides the storage apparatus 55 with the generated image including the character information already inserted into the predetermined position in the caption display area.

Figure 13:
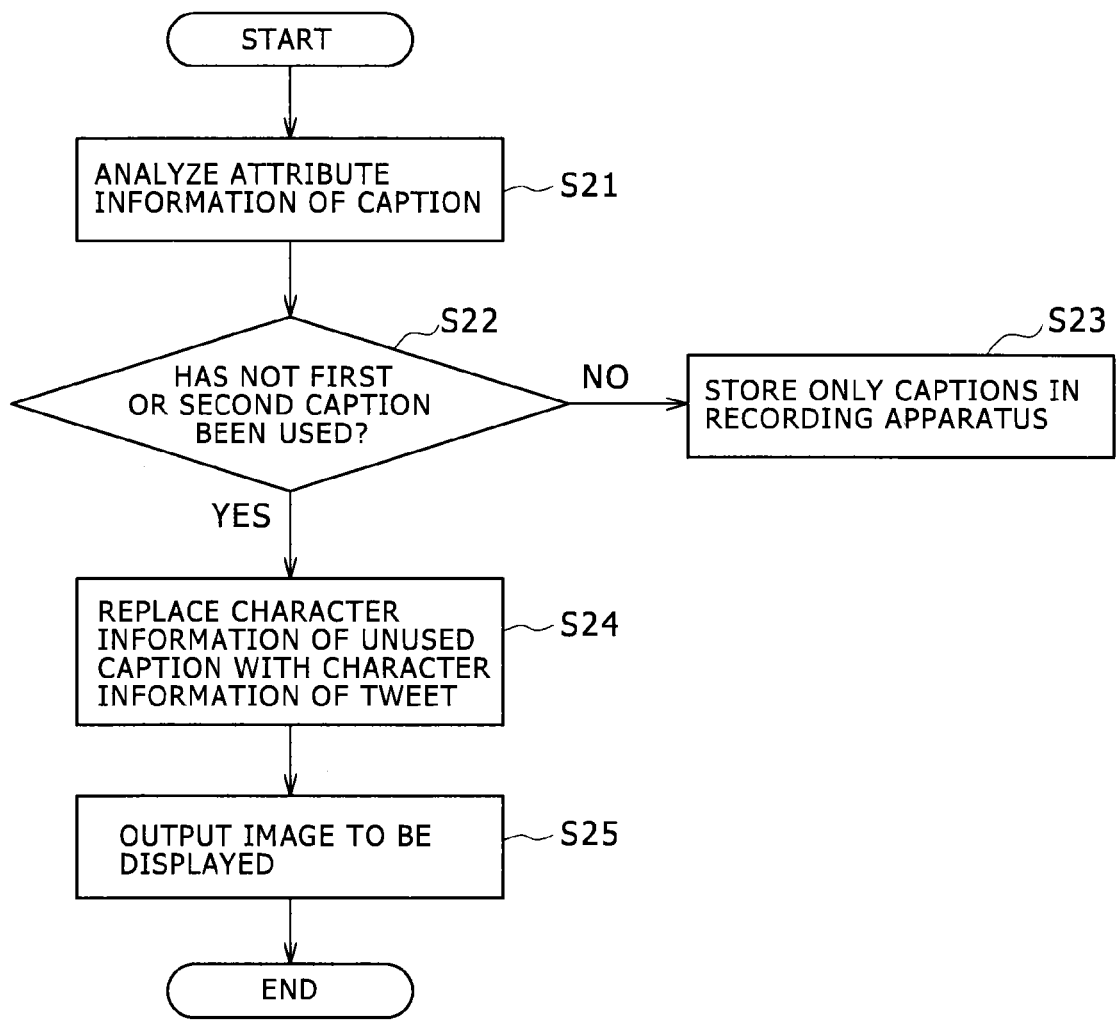
FIG. 13 shows a flowchart representing typical processing carried out by the video-picture-recording processing section according to the second embodiment to record a tweet.

FIG. 13 shows a flowchart representing typical processing carried out by the video-picture-recording processing section 81 according to the second embodiment to record a tweet.

As shown in the figure, the flowchart begins with a step S21 at which, first of all, the attribute-information analysis portion 82 employed in the video-picture-recording processing section 81 analyzes attribute information of a caption included in a received broadcast program. Then, at the next step S22, the attribute-information analysis portion 82 determines whether a first or second caption has not been used. If the attribute-information analysis portion 82 determines at the step S22 that the first and second captions have been used, the flow of the processing goes on to a step S23 at which the recording portion 83 stores the first and second captions in the recording apparatus 55 as they are along with the video picture.

If the attribute-information analysis portion 82 determines at the step S22 that the first or second caption has not been used, on the other hand, the flow of the processing goes on to a step S24 at which the recording portion 83 replaces the character information of the unused caption with the character information of a tweet. If only the second caption is available for example, a caption is inserted into the first caption as it is whereas the character information of a tweet is inserted into the caption position of the second caption on the basis of information on the caption position.

Then, at the next step S25, the recording portion 83 records a video picture to be displayed into the storage apparatus 55. The video picture to be displayed includes the character information of a tweet inserted into the caption position of the available second caption in the caption display area. Then, the processing represented by this flowchart is terminated at the end of the process carried out at the step S25.

In accordance with the second embodiment explained above, it is possible to place the character information of a tweet at a caption position determined by a broadcasting station and record an image including the character information of the tweet in the storage apparatus 55. Thus, at a recording time, it is possible to record the character information of a tweet without improperly veiling a position on the program image existing in the background of an area allocated to the caption.

In addition, in accordance with the ARIB standard, two captions can be inserted into one broadcast program and the user is allowed to select any arbitrary one of the two captions. If the broadcasting station makes use of only one caption, the character information of a tweet can be inserted into the position of the other caption which is not used for displaying the character information of the other caption, and the character information of a tweet can thus be recorded along with the video picture of the broadcast program. In addition, if the character information of a tweet is stored as caption information, the character information of a tweet can be handled in the same way as a video picture recorded by adoption of the method in the past. Thus, the second embodiment is compatible even with other recording apparatus made by other companies as long as the other recording apparatus conform to typically the BD (Blue-ray Disk).

It is to be noted that, at a recording time, attribute information is analyzed to determine whether or not a caption exists so as to determine whether or not the two caption positions are available. If the two caption positions are not available, one of the two caption positions can be selected and the character information of a tweet may be inserted into the selected caption position over a caption which would otherwise be displayed at the selected caption position.

3: Third Embodiment

A third embodiment is a typical embodiment applying the principle of the character-information displaying processing, which is carried out by the image processing apparatus 3 shown in FIG. 5 according to the first embodiment, to a reproduction apparatus 90.

First of all, the configuration of the reproduction apparatus 90 according to the third embodiment is explained as follows.

Figure 14:
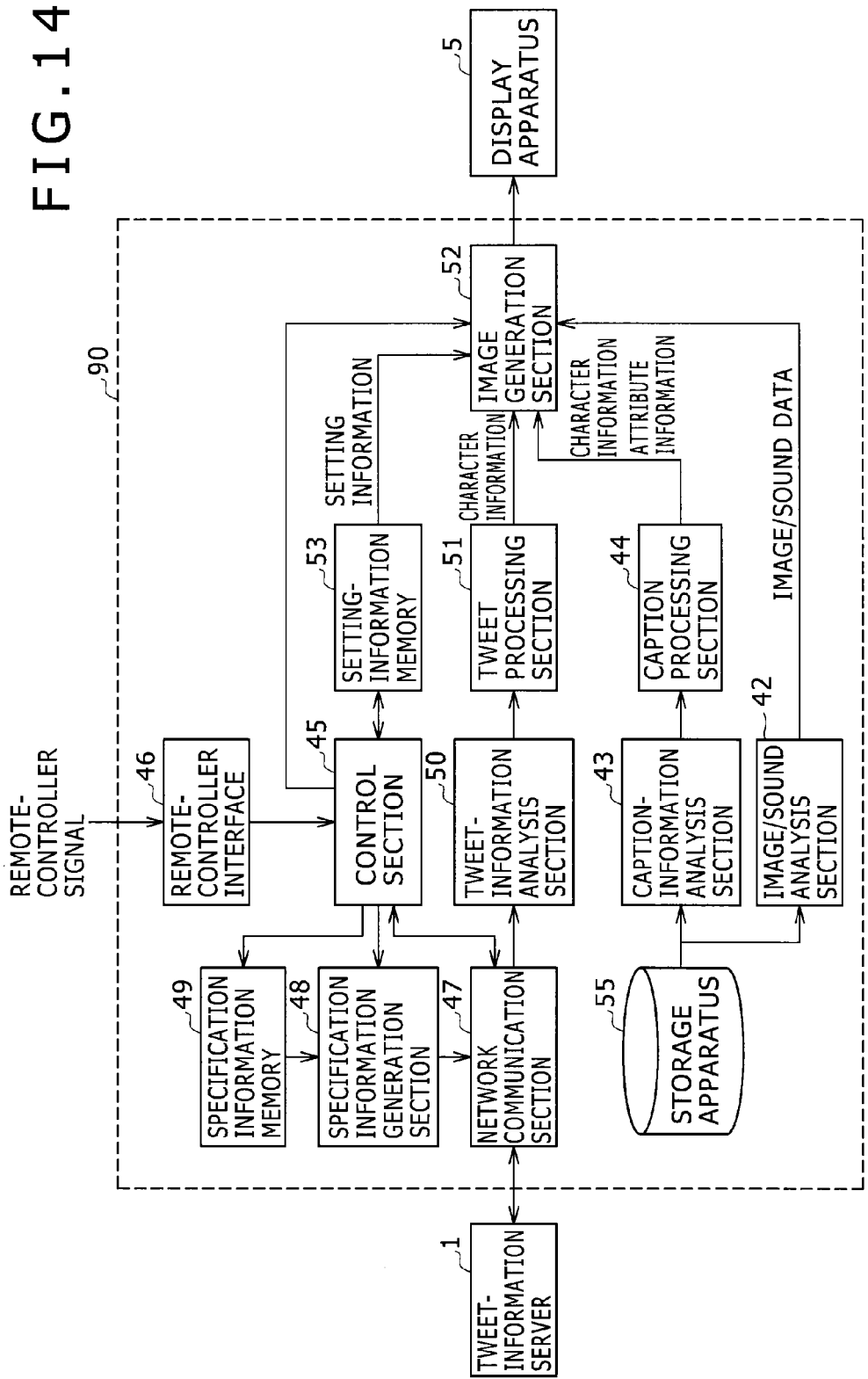
FIG. 14 is a block diagram showing a typical internal configuration of a reproduction apparatus according to a third embodiment.

FIG. 14 is a block diagram showing a typical internal configuration of the reproduction apparatus 90 according to the third embodiment.

In FIG. 14, each component identical with its counterpart employed in the image processing apparatus 3 shown in FIG. 5 is denoted by the same reference numeral as the counterpart and details of such a component are not explained. The reproduction apparatus 90 shown in FIG. 14 employs a storage apparatus 55 in place of the program receiving section 41 employed in the image processing apparatus 3 shown in FIG. 5 to serve as a source for supplying the contents of a video picture including a caption. The remaining components other than the storage apparatus 55 have configurations common to the reproduction apparatus 90 and the image processing apparatus 3.

Next, the configuration of an image generation section 52 employed in the reproduction apparatus 90 according to the third embodiment is explained as follows.

Figure 15:
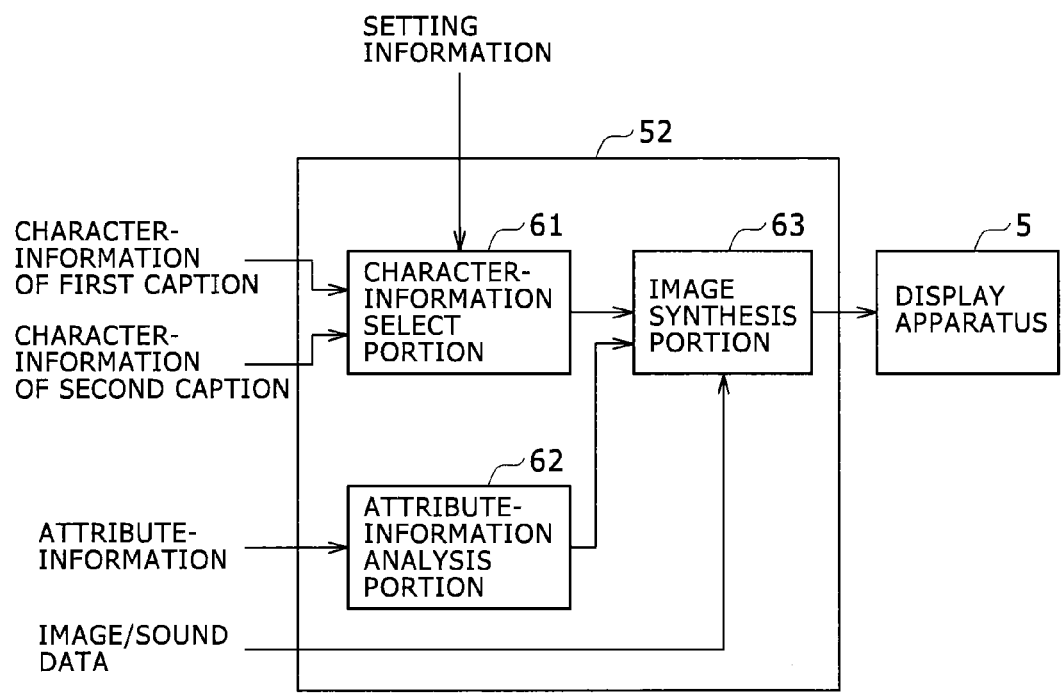
FIG. 15 is a block diagram showing a typical internal configuration of an image generation section employed in the reproduction apparatus according to the third embodiment.

FIG. 15 is a block diagram showing a typical internal configuration of the image generation section 52 employed in the reproduction apparatus 90 according to the third embodiment. The typical configuration shown in FIG. 15 is identical with the configuration of the image generation section 52 employed in the image processing apparatus 3 shown in FIG. 6 according to the second embodiment. It is assumed that, in the typical configuration shown in FIG. 15, the character information of a tweet is inserted into a first caption of the contents of a video picture including captions whereas the character information of a caption is inserted into a second caption of the contents, the contents being read out from the recording apparatus 55.

In accordance with the third embodiment, the character information of a tweet is placed at a caption position determined by a broadcasting station, and the contents of a recorded video picture are read out from a recording apparatus to reproduce the video picture. Thus, at a reproduction time, it is possible to reproduce the character information of a tweet without improperly veiling a position on a program image existing in the background of an area allocated to the caption.

In the embodiments described above, the character information of a tweet having a character count within a predetermined number of characters is explained as a typical example of character information to be displayed on a screen along with a broadcast program. However, the character information to be displayed on a screen along with a broadcast program does not have to be the character information of such a tweet. For example, what is written on an electronic board or the like can also be taken as an example of such character information. That is, the character information to be displayed on a screen along with a broadcast program can be any other character information as long as the other character information can be expressed by a relatively short sentence. The effects of the embodiments of the present disclosure can also be obtained as well for such a relatively short sentence.

In addition, the present disclosure can also be applied as well even to a standard other than the ARIB standard which is a Japanese digital broadcasting standard. Typical examples of the other standard are the DVB which is the European digital broadcasting standard and the ATSC which is the American digital broadcasting standard provided that information on the display position of a caption is included in the character information for a broadcast program.

It is to be noted that, in the typical configuration shown in FIG. 1, the image processing apparatus 3 and the display apparatus 5 are provided separately from each other. However, the configuration of the character-information display system does not have to be the typical configuration shown in FIG. 1. For example, the character-information display system can also be a TV receiver having all the functions embedded therein.

It is to be noted that the series of processes according to the embodiments described previously can be carried out by hardware or execution of software. If the series of processes described above is carried out by execution of software, programs composing the software can be installed into a computer embedded in dedicated hardware or a general-purpose computer. A general-purpose computer is a computer which can be made capable of carrying out a variety of functions by installing a variety of programs into the computer.

In addition, the recording medium used for recording the program codes of the software for implementing the functions of each of the embodiments described above is provided to the system or the apparatus. Then, the computer (or a control section such as a CPU) of the system or the apparatus reads out the program codes recorded on the recording medium to execute the programs composing the software. In this way, it is possible to implement the functions of each of the embodiments described above.

On top of that, as described above, by executing the program codes read out by the computer, it is possible to implement the functions of each of the embodiments explained so far. In addition, on the basis of instructions of the program codes, an OS operating on the computer carries out some or all of the actual processes. By carrying out some or all of the actual processes, it is possible to implement the functions of each of the embodiments explained above in some cases.

In addition, in this specification of the present disclosure, steps of a flowchart representing the processing described above can of course be carried out in a prescribed order along the time axis. However, the steps do not have to be carried out in the prescribed order along the time axis. Instead, the steps can also be carried out concurrently or individually. That is, the processing represented by the flowchart may typically include parallel processing or object-oriented processing.

It should be noted that the technique according to the present disclosure can also adopt configurations as will be described above.

1: An image processing apparatus includes:
a program receiving section configured to receive a broadcast program;
a caption extraction section configured to extract caption character information composing a caption of the broadcast program received by the program receiving section and attribute information from the broadcast program;

a video-picture extraction section configured to extract the video picture of the broadcast program received by the program receiving section;

a communication section configured to carry out communications with an apparatus external to the image processing apparatus;

a character-information acquisition section configured to acquire character information created in association with the broadcast program from a server, in which a plurality of pieces of such character information have been stored, by way of the communication section; and an image generation section configured to output the video picture including the character information inserted into the position of the caption character information on the video picture, to a display apparatus on the basis of information on the position of the caption character information, the position information being included in the attribute information.

2: The image processing apparatus like the one described as a paragraph 1 further includes:

a program-information acquisition section configured to acquire information on the broadcast program received by the program receiving section along with the broadcast program; and a specification-information generation section configured to generate specification information used for specifying the character information associated with broadcasting-station information included in the information on the broadcast program, and acquiring the character information from the server, wherein the communication section transmits the specification information to the server; and the character-information acquisition section receives the character information associated with the broadcasting-station information, the character information being transmitted by the server in response to the specification information.

3: The image processing apparatus like the one described as the paragraph 1 further includes a specification-information generation section configured to generate specification information used for specifying the character information associated with information set by the user, and acquiring the character information from the server, wherein: the communication section transmits the specification information to the server; and the character-information acquisition section receives the character information associated with the information set by the user, the character information being transmitted by the server in response to the specification information.

4: The image processing apparatus like the one described as the paragraph 1 further includes:

a program-information acquisition section configured to acquire information on the broadcast program received by the program receiving section along with the broadcast program;

a character recording apparatus in which a plurality of characters have been registered;

a character extraction section configured to extract a character from the information on the broadcast program, and acquiring a character corresponding to the extracted character from among the characters registered in a character dictionary;

a Roman-character conversion section configured to convert the corresponding character acquired by the character extraction section into a Roman character; and a specification-information generation section configured to generate specification information used for specifying the character information associated with the Roman character, and acquiring the character information from the server, wherein the communication section transmits the specification information to the server; and the character-information acquisition section receives the character information associated with information set by the user, the character information being transmitted by the server in response to the specification information.

5: In the image processing apparatus like the apparatus described as any one of paragraphs 2 to 4, the image generation section includes a character-information select portion configured to select the caption character information or the character information in accordance with set information as character information to be inserted into the position of the caption character information in the video picture.

6: In the image processing apparatus like the apparatus described as any one of the paragraphs 2 to 5, the image generation section inserts pieces of the character information acquired by the character-information acquisition section from the server into the position of the caption character information in the video picture in an order of character-information acquisition times at fixed time intervals.

7: In the image processing apparatus like the apparatus described as any one of the paragraphs 2 to 6, the character information is a character string having a character count within a predetermined number of characters.

8: A video-picture recording apparatus includes:

a program receiving section configured to receive a broadcast program;

a caption extraction section configured to extract caption character information composing a caption of the broadcast program received by the program receiving section and attribute information from the broadcast program;

a video-picture extraction section configured to extract the video picture of the broadcast program received by the program receiving section;

a communication section configured to carry out communications with an apparatus external to the image processing apparatus;

a character-information acquisition section configured to acquire character information created in association with the broadcast program from a server, in which a plurality of pieces of such character information have been stored, by way of the communication section; and a video-picture-recording processing section configured to output the video picture including the character information inserted into the position of the caption character information on the video picture, to a display apparatus on the basis of information on the position of the caption character information, the position information being included in the attribute information.

It is to be noted that implementations of the present disclosure are not limited to the embodiments described above. That is, the present disclosure can also be implemented as one of a variety of modified versions obtained by changing the embodiments and applied to a variety of applications without departing from the spirit and scope of claims described in the specification of the present disclosure.

The present disclosure contains subject matter related to that disclosed in Japanese Priority Patent Application JP 2011-118903 filed in the Japan Patent Office on May 27, 2011, the entire content of which is hereby incorporated by reference.

What is claimed is:

1. An image processing apparatus comprising:
a network interface that receives
character information from a remote device, and
broadcast program information, the program information including audio-visual data to be displayed and caption attribute information; and
circuitry configured to insert the character information in a caption portion of the program information for display on a display device based in part on position and size information of the caption portion on the display device, the position and size information being included in the caption attribute information,
wherein
the character information is received from a different source than that of the broadcast program information,
the network interface receives the character information from the remote device in response to transmitting a request to the remote device, the request including location information relating to the broadcast program information, the location information being generated by searching a storage device for specification information associated with an identified broadcast station.

2. The apparatus of claim 1, wherein
the character information is program-related character information, and
the circuitry inserts the program-related character information for display on a display device.

3. The apparatus of claim 1, wherein the circuitry inserts the character information for display on a display apparatus at a fixed location on the image when the caption character information is not included in the broadcast program information.

4. The apparatus of claim 1, wherein the circuitry is further configured to search a storage device for specification information associated based on user setting information and send an address to the remote device for identification of the character information that corresponds with the user setting information.

5. The apparatus of claim 1, wherein the circuitry is further configured to generate specification information based on characters included in electronic program guide information and acquire the character information about a program that is not directly broadcast to the apparatus from a broadcast station.

6. The apparatus of claim 1, wherein the circuitry selects the character information as caption information when obtained and selects the character information as a short-sentence service when received.

7. The apparatus of claim 1, wherein the circuitry inserts the character information in the caption portion of the program information in order of character-information acquisition time for fixed time intervals.

8. The apparatus of claim 1, wherein a number of characters in the character information is limited to a predetermined number.

9. The image processing apparatus of claim 8, wherein the predetermined number is 140.

10. The apparatus of claim 1, wherein the circuitry is further configured to prepare and store a video image that has the character information inserted in the caption portion of the program information.

11. The image processing apparatus of claim 1, wherein the specification information is a hash-tag and the location information is generated based on the hash-tag.

12. The image processing apparatus of claim 1, wherein the location information indicates a location at which the character information is located at the remote device.

13. An image processing method comprising:
receiving, at a network interface, character information from a remote device;
receiving, at the network interface, broadcast program information, the program information including audio-visual data to be displayed and caption attribute information; and
inserting, via a processor, the character information in a caption portion of the program information for display on a display device based in part on position and size information of the caption portion on the display device, the position and size information being included in the caption attribute information,
wherein
the character information is received from a different source than that of the broadcast program information,
the network interface receives the character information from the remote device in response to transmitting a request to the remote device, the request including location information relating to the broadcast program information, the location information being generated by searching a storage device for specification information associated with an identified broadcast station.

14. The method of claim 13, wherein
the character information is program-related character information, and
the inserting includes inserting the program-related character information for display on a display device.

15. The method of claim 13, wherein the inserting inserts the character information for display on a display apparatus at a fixed location on the image when the caption character information is not included in the broadcast program information.

16. The method of claim 13, further comprising:
searching a storage device for specification information associated based on user setting information and sending the location information to the remote device for identification of the character information that corresponds with the user setting information.

17. The method of claim 13, further comprising:
generating specification information based on characters included in electronic program guide information and acquiring the character information about a program that is not directly broadcast to the apparatus from a broadcast station.

18. The method of claim 13, wherein the selecting includes selecting the character information as caption information when obtained and selecting the character information as a short-sentence services when received.

19. A non-transitory computer readable storage medium having instructions stored therein that when executed by a computer cause the computer to perform a method comprising:
receiving character information from a remote device;
receiving broadcast program information, the program information including audio-visual data to be displayed and caption attribute information; and
inserting with the processing circuit the character information in a caption portion of the program information for display on a display device based in part on position and size information of the caption portion on the display device, the position and size information being included in the caption attribute information, wherein the character information is received from a different source than that of the broadcast program information, the network interface receives the character information from the remote device in response to transmitting a request to the remote device, the request including location information relating to the broadcast program information, the location information being generated by searching a storage device for specification information associated with an identified broadcast station.

* * * * *